US012438281B2

(12) United States Patent
Haziza

(10) Patent No.: US 12,438,281 B2
(45) Date of Patent: Oct. 7, 2025

(54) VARIABLE DIELECTRIC BASED ANTENNA WITH IMPROVED RESPONSE TIME

(71) Applicant: SDEROTECH, INC., Kiryat Bialik (IL)

(72) Inventor: Dedi David Haziza, Kiryat Motzkin (IL)

(73) Assignee: SDEROTECH, INC., Kiryat Bialik (IL)

( * ) Notice: Subject to any disclaimer, the term of this patent is extended or adjusted under 35 U.S.C. 154(b) by 30 days.

(21) Appl. No.: 17/989,486

(22) Filed: Nov. 17, 2022

(65) Prior Publication Data

US 2023/0187836 A1 Jun. 15, 2023

Related U.S. Application Data

(60) Provisional application No. 63/399,570, filed on Aug. 19, 2022, provisional application No. 63/281,593, filed on Nov. 19, 2021.

(51) Int. Cl.

| | |
|---|---|
| ***H01P 1/18*** | (2006.01) |
| ***H01Q 3/32*** | (2006.01) |
| ***H01Q 3/36*** | (2006.01) |
| ***H01Q 7/00*** | (2006.01) |
| ***H01Q 13/08*** | (2006.01) |
| ***H01Q 13/20*** | (2006.01) |

(52) U.S. Cl.

CPC ............. *H01Q 13/08* (2013.01); *H01P 1/184* (2013.01); *H01Q 3/32* (2013.01); *H01Q 3/36* (2013.01); *H01Q 7/00* (2013.01); *H01Q 13/206* (2013.01)

(58) Field of Classification Search

CPC ............ H01P 1/181; H01P 1/184; H01P 1/18; H01Q 3/26; H01Q 3/2694; H01Q 3/30; H01Q 3/32; H01Q 3/36; H01Q 13/206

See application file for complete search history.

(56) References Cited

U.S. PATENT DOCUMENTS 5,694,134 A 12/1997 Barnes
6,496,147 B1 12/2002 Kirino
7,061,370 B2 6/2006 Cern
(Continued)

FOREIGN PATENT DOCUMENTS

CN 111201667 A 5/2020
JP H0915546 A 1/1997
(Continued)

OTHER PUBLICATIONS

ISearch Report for PCT/IB2022/061169, Jun. 14, 2023, 4 pages.
Written Opinion for PCT/IB2022/061169, Jun. 14, 2023, 7 pages.
International Preliminary Report on Patentability for PCT/IB2022/061169, May 2, 2024, 8 pages.
Notice of Reasons for Refusal for Japanese Patent Application No. 2024529949, Apr. 22, 2025, 7 pages.
Search Report for Taiwan Application No. 111144118, Oct. 4, 2023, 4 pages.

*Primary Examiner* — Stephen E. Jones
(74) *Attorney, Agent, or Firm* — WOMBLE BOND DICKINSON (US) LLP

(57) ABSTRACT

Natural response time for domains to assume their natural relaxed state is accelerated by forcing the domains to assume the natural state. The forcing may be done by application of electric field, magnetic field, or application of mechanical, hydraulic or sonic pressure. Additionally, an RF choke and/or one or more RF traps, are incorporated in the structure. When the forcing is implemented via electric field, the control signals may be applied onto the transmission lines and to at least one control line flanking each of the signal lines.

19 Claims, 6 Drawing Sheets

(56) References Cited

U.S. PATENT DOCUMENTS

| | | | | |
|---|---|---|---|---|
| 7,466,269 | B2 | 12/2008 | Haziza | |
| 7,884,766 | B2 | 2/2011 | Haziza | |
| 10,199,710 | B2 | 2/2019 | Haziza | |
| 10,705,391 | B2 | 7/2020 | Haziza | |
| 11,011,854 | B2 | 5/2021 | Haziza | |
| 2009/0278744 | A1 | 11/2009 | Kirino | |
| 2013/0069848 | A1 | 3/2013 | Toyao | |
| 2016/0241217 | A1 | 8/2016 | Sazegar | |
| 2017/0237172 | A1 | 8/2017 | Nysen | |
| 2017/0256865 | A1 | 9/2017 | Sikes | |
| 2018/0062268 | A1 | 3/2018 | Haziza | |
| 2018/0159213 | A1 | 6/2018 | Haziza | |
| 2019/0064609 | A1* | 2/2019 | Haziza | H01Q 21/065 |
| 2019/0229769 | A1 | 7/2019 | Henry | |
| 2020/0028254 | A1 | 1/2020 | Foo | |
| 2020/0112102 | A1 | 4/2020 | Haziza | |

FOREIGN PATENT DOCUMENTS

| | | | |
|---|---|---|---|
| JP | H11109359 | A | 4/1999 |
| JP | 2004257782 | A | 9/2004 |
| JP | 2005524248 | A | 8/2005 |
| JP | 2007273537 | A | 10/2007 |
| JP | 2019064609 | A | 4/2019 |
| JP | 2019537850 | A | 12/2019 |
| JP | 2020532911 | A | 11/2020 |
| TW | 201913203 | A | 4/2019 |

* cited by examiner

VARIABLE DIELECTRIC BASED ANTENNA WITH IMPROVED RESPONSE TIME

CROSS-REFERENCE TO RELATED APPLICATIONS

This application claims priority from U.S. Provisional Application No. 63/281,593, filed Nov. 19, 2021, and U.S. Provisional Application No. 63/399,570, filed Aug. 19, 2022, the disclosures of which are incorporated herein by reference in their entireties.

BACKGROUND

1. Field

The subject disclosure relates to improvements in response time of liquid crystal domains, especially beneficial when used in conjunction of electronic devices, such as, e.g., variable dielectric constant antenna and electromagnetic signal transmission elements.

2. Related Art

The subject inventor has previously disclosed in U.S. Pat. No. 10,705,391, which is incorporated herein by reference in its entirety, an improved control of the orientation of liquid crystal domains. The disclosed embodiments in that patent utilize plurality of electrodes, each having independent control line to enable rapid placement of the domain system in a desired state. For full understanding of certain embodiments and features disclosed herein, it is highly recommended to study the '391 patent.

As explained in the '391 patent, when an appropriate electrical field is applied, the molecules (domains) rotate an amount that correlates with the strength of the applied field, and when the field is removed the molecules return to their relaxed state. However, the temporal response to application of the field, i.e., "turning on" or aligning the domains, is much faster than the temporal response to turning off the field, i.e., "turning off" or relaxing the domains. In certain applications, such as those disclosed by the subject inventor in U.S. Pat. Nos. 7,466,269, 7,884,766 and 10,199,710, which are incorporated herein by reference, it is highly desirable to have the turn off response at speeds similar to the turn on response.

Embodiments disclosed in the '391 patent utilize plurality of electrodes, each having independent control line to enable rapid placement of the domain system in a desired state. By applying different potentials at different polarizations to the individual electrodes, various modes, or states, can be defined within the liquid crystal system. The direction and amplitude of the director can be controlled by the magnitude of the applied potential and the selection of the electrodes to which the potential is applied. As disclosed in, e.g., the embodiment of FIG. 4 of the '391 patent, by applying potential to the RF transmission line, the RF line may also function to control the orientation of the domains. However, the subject inventors have discovered that the presence of the control lines in such an arrangement interfere with the RF signal traveling in the RF transmission line. Accordingly, the inventors sought to avoid such an interference, while not degrading the turn off response time. This issue is a fundamental challenge that so far prohibited the implementation of multi-electrode solution inside an antenna.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments accelerate the response time of domains within a variable dielectric constant (VDC) layer. The embodiments specifically address the slow natural response time when an aligning electric field ("turn on") is removed, whereby the domains assume their natural relaxed state, in which the domains are not aligned and are randomly oriented with respect to each other, unless they are close to areas where mechanical rubbing and or other mechanical alignment methods were applied on the surface layer. As disclosed herein, this natural relaxation time is accelerated by forcing the domains to assume the natural state. The forcing may be done by application of electric field, magnetic field, and application of mechanical, hydraulic or sonic pressure. Any of the disclosed embodiments may additionally incorporate an RF choke and/or one or more RF traps, as disclosed herein. When the forcing is implemented via electric field, beneficially the control signals are applied onto the transmission lines and to at least one control line flanking each of the signal lines.

An electronic transmission device transmitting electrical signals is disclosed, comprising: a variable dielectric constant (VDC) structure having variable VDC material sandwiched between a bottom dielectric plate and a top dielectric plate, the VDC material having plurality of orientable domains; a common potential plate positioned below the bottom dielectric plate; a plurality of transmission lines positioned above the top dielectric plate, each transmission line transmitting the electrical signals; a plurality of control lines, wherein each one of the transmission lines is paired with at least one of the control lines, such that the sphere of influence of paired control line and transmission line overlaps; and a plurality of ports connecting control potentials among the common potential plate, the plurality of transmission lines and the plurality of control lines to thereby control spatial orientation of the domains.

Also, an antenna is disclosed, comprising: a variable dielectric constant plate having a top dielectric plate, a bottom dielectric plate, and a variable dielectric material between the top and bottom dielectric plates; a common potential plate provided below the bottom dielectric plate; a plurality of radiators; a plurality of control lines provided over the top dielectric plate; a plurality of transmission lines provided above the top dielectric plate, each of the transmission lines coupled to one of the radiators and to an RF port, and each one of the transmission lines is paired with at least one of the control lines, such that the sphere of influence of paired control line and transmission line overlaps; and a plurality of control ports connecting control potentials among the common potential plate, the plurality of transmission lines and the plurality of control lines to thereby control spatial orientation of domains within the variable dielectric constant material.

Further, an electronic transmission device transmitting electrical signals is disclosed, comprising: a variable dielectric constant (VDC) structure having variable VDC material sandwiched between a bottom dielectric plate and a top dielectric plate, the VDC material having plurality of orientable domains; a common potential plate positioned below the bottom dielectric plate; a plurality of transmission lines positioned above the top dielectric plate, each transmission line transmitting the electrical signals; and a pressure applicator applying to the VDC structure one of: mechanical pressure, magnetic pressure, sonic pressure, and hydraulic pressure.

In the disclosures, the common potential plate may comprise a peripheral area at grounded potential, interior area at floating potential, and an RF chock positioned between the peripheral area and the interior area. Each transmission line may be paired with two control lines and the plurality of transmission lines may be coupled to a common RF port. Each one of the plurality of control ports may be connected to only one of the transmission lines or control lines. Each of the control lines may comprise at least one RF trap, wherein each RF trap may comprise: a common stem connected to the control line; a splitter connected to the common stem; a plurality of frequency matching branches, each connected to the splitter and each having an overlap section spatially parallel to an overlap section of another frequency matching branch. Each branch of the frequency matching branches has a different length than other branches of the same frequency matching branches. The device may further comprise a pressure applicator applying to the VDC structure one of: mechanical pressure, magnetic pressure, sonic pressure, and hydraulic pressure.

Additionally, a method of operating a transmission device having conductors provided over a variable dielectric constant plate is disclosed, comprising: applying signals to at least a first subset of the conductors to cause transmission of the signals; applying control signal to at least a second subset of the conductors to cause domains within the variable dielectric constant plate to align according to field generated by the control signal; stopping application of the control signal to thereby cause the domain to relax to natural orientation; and applying pressure onto the domains to thereby accelerate time required for the domain to relax to natural orientation.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1A is a cross-section of a part of an electronic device showing domain control according to an embodiment, while FIG. 1B illustrates a top view of part of the device marked by dashed oval in FIG. 1A.

FIG. 2A is a cross-section of a part of an electronic device showing domain control according to an embodiment, while FIG. 2B illustrates a top view of part of the device marked by dashed oval in FIG. 2A.

FIG. 3A is a cross-section of a part of an electronic device showing domain control according to an embodiment, while

FIG. 4A is a cross-section of a part of an electronic device showing domain control with mechanical pressure according to an embodiment, while

DETAILED DESCRIPTION

Embodiments of the inventive system and method for improving response time of variable dielectric constant will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Figures 1A, 1B:
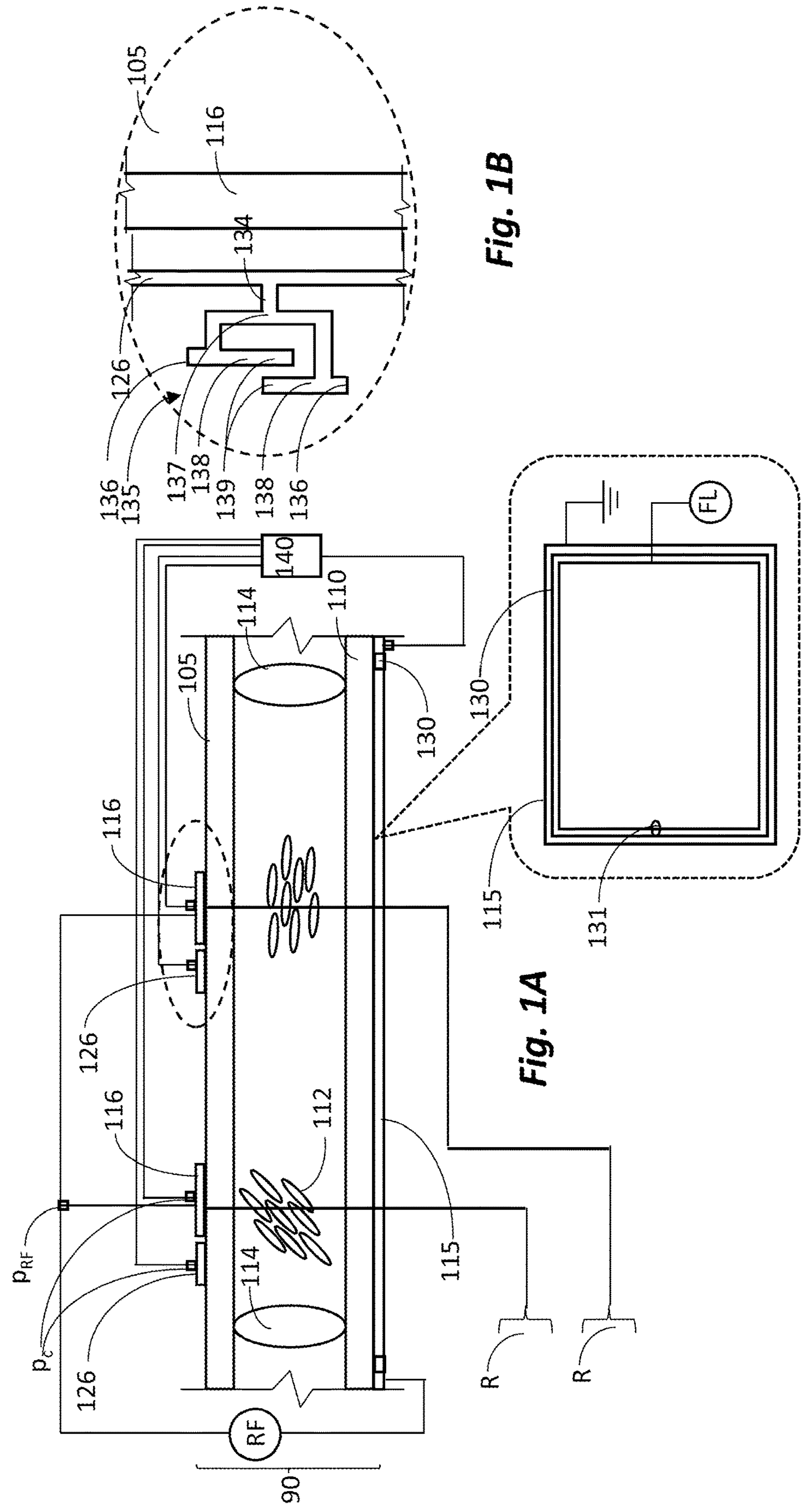

FIG. 1A is a cross-section of a part of an electronic device showing domain control according to an embodiment, while FIG. 1B illustrates a top view of part of the device marked by dashed oval in FIG. 1A. FIG. 1A illustrates an example of a transmission device having transmission lines 116 formed over the variable dielectric constant (VDC) structure 90. The transmission lines 116 transmit the signal of interest, e.g., the RF signal of an antenna. The liquid crystal material 112, e.g., nematic phase liquid crystals, is sandwiched between an upper dielectric plate 105 and a bottom dielectric plate 110, which are separated by spacers 114. A plurality of transmission lines (two shown) 116 are positioned above the upper dielectric 105 and a control line 126 is provided next to each transmission line 116, providing paired transmission and control lines. The control lines 126 do not transmit electrical signals, but are only used to apply electric field to orient the domains 112. The orientation of the director localized to the area under the transmission line is controlled by applying voltage potential to the transmission line 116, the control line 126, or to both. As explained in the above cited patents, when the structure is implemented as an antenna, each transmission line is coupled to a radiator R of an array of radiators and the focusing and steering of the array is done by controlling the characteristics of the transmission in each transmission line.

In the context of this disclosure, when a control line is said to be paired with a transmission lines, it means that the sphere of influence of paired control line and transmission lines overlap. This means that when a control potential is applied to a control line, its sphere of influence, i.e., the area in the VDC plate in which the domains change orientation due to the application of the control potential, overlaps to a certain extent with the sphere of influence when a control potential is applied to the paired transmission line. Stated another way, when a control potential is applied to a transmission line, the domain below the transmission line change orientation, thereby locally changing the dielectric constant below the transmission line. Similarly, when the control potential is applied to the paired control line, it changes the orientation of the domain below the paired transmission line, thereby changing the dielectric constant below the transmission line. In this sense, it is said that the sphere of influence of the paired control line and transmission line overlap. Importantly, it does not mean that the field of influence must completely and exactly overlap, but it means that it overlap sufficiently so that applying control potential to the control line would affect the dielectric constant below the paired transmission line.

The signal to be transmitted through the system, e.g., RF signal in the Ka, Ku, or other bands, travels through one or more transmission lines 116, which are coupled to an RF port, $P_{RF}$. Note that the RF port may be common to all of the transmission lines and may be, e.g., a coaxial connector. By changing the orientation of the domains under each transmission line independently, the characteristics of the transmission can be controlled, e.g., a delay can be introduced into the signal traveling in any of the transmission lines 116. As noted, this can be done by applying potential to the transmission line 116, the paired control line 126, or to both. This is exemplified in FIG. 1A by the separate and independent lines from the controller 140 to the transmission lines 116 and the control lines 126. Note that separate and independent control ports, $P_c$, are provided for the control and transmission lines, so that each control lines and transmission line can receive different and independent control potential. Incidentally, the signal output from the controller is generally a square wave and by controlling the period (duty cycle) and amplitude of the square wave the strength of the field applied onto the liquid crystal material can be controlled.

It should be noted that in the embodiment of FIG. 1A, an optional RF choke 130 is implemented to enable the use of a single common plate for both the transmission signal and the control signal. The dotted-line callout in FIG. 1A illustrates a top view of the common plate 115 in reduced size. Rather than using a standard ground plate, in FIG. 1A the ground potential of the controller 140 and of the RF source 145 is connected to the periphery of common plate 115—exterior to the RF choke 130. Thus, the periphery of the common plate 115 is at ground potential, shaped as a frame around the RF choke and the interior section of the plate. Conversely, the interior section of the common plate 115 that is situated interior to the RF choke 130 is floating and is not DC grounded. The RF choke enables the RF signal to "jump" the choke, i.e., from the RF signal perspective the entire common plate 115 is grounded. Conversely, the RF choke forms a DC break, such that from the DC potential that is applied to control the domains, the common plate 115 is not grounded but rather floating, as indicated by the circled FL. That is, in disclosed embodiments the common potential plate may be grounded, floating, or partially grounded and partially floating with an RF chock between the floating and grounded parts.

With this disclosure, an electronic transmission device is provided for transmitting electrical signals, comprising: a variable dielectric constant (VDC) structure having variable VDC material sandwiched between a bottom dielectric plate and a top dielectric plate, the VDC material having plurality of orientable domains; a common potential plate positioned below the bottom dielectric plate; a plurality of transmission lines positioned above the top dielectric plate, each transmission line transmitting the electrical signals; a plurality of control lines, wherein each transmission line is paired with at least one of the control lines such that the sphere of influence of paired control line and transmission line overlaps; a plurality of control ports connecting control potentials among the common potential plate, the plurality of transmission lines and the plurality of control lines to thereby control spatial orientation of the domains. The common potential plate may be grounded, floating, or partially grounded and partially floating with an RF chock between the floating and grounded parts.

While the system may be operated as described above, a problem arises in that a capacitive coupling is introduced between each transmission line 116 and its paired control line 126. This capacitive coupling reduces the efficiency of the signal transmission in the transmission line 116. Accordingly, as illustrated in the top view of FIG. 1B an RF trap 135 is added to the control line. The trap 135 is designed to cancel out any signal that is coupled from the transmission line 116 onto the paired control line 126.

As shown in FIG. 1B, the RF trap 135 is designed to include a connecting stem 134 coupling the RF signal from the control line to the splitter 137, so as to split any transmission signal coupled from the transmission line onto the control line into multiple brunches (two branches shown in FIG. 1B). The total length of the signal travel path in each branch is designed such that at the end of the travel path the signals arrive at a complementary polar orientation between the branches, thus constructively cancelling each other. So, for example, in the embodiment shown in FIG. 1B where two branches are illustrated, the signals at one branch arrive at a 180 degrees phase shift with respect to the other branch. After the split, each signal part enters a frequency match section 138, which includes a match stab 136 and an overlap section 139. The signals cancel each other at the overlap section 139.

The match stab 136 is used for tuning the RF trap to the desired frequency band. It is used to eliminate any reactive components generated at the transmission line and hence help in tuning the match [S11] at the operating frequency of the band of the RF trap. The overlap section 139 of one branch is designed to overlap in a parallel orientation to the overlap section of the other branch. Since the signals in the branches arrive at the overlap section 139 at a complementary polarity, they cancel each other. Consequently, the transmission signal coupled onto the control line is added to amount to zero, so that it does not interfere with the transmission signal traveling in the transmission line.

Figures 2A, 2B:
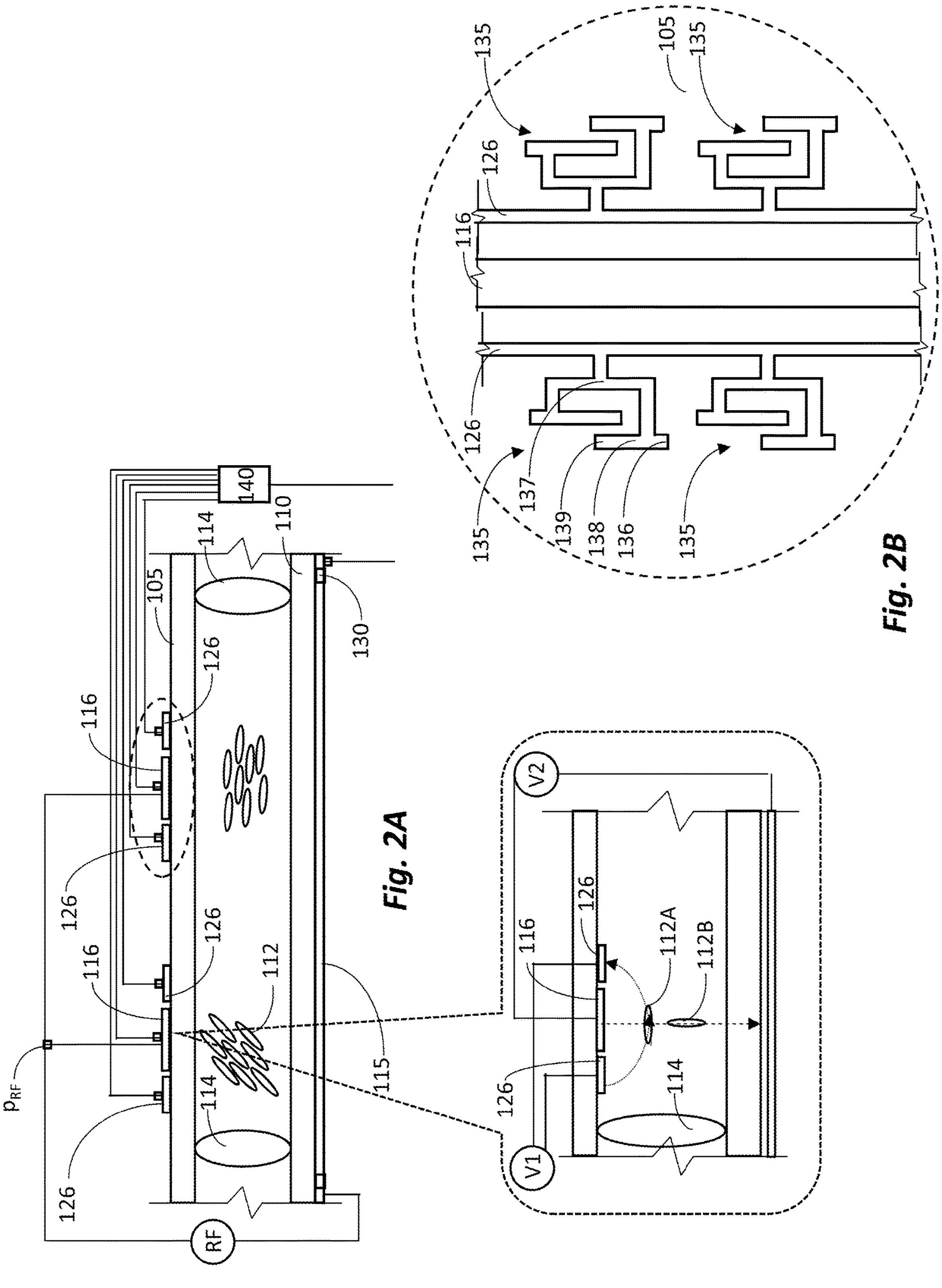

FIG. 2A is a cross-section of a part of an electronic device showing domain control according to an embodiment, while FIG. 2B illustrates a top view of part of the device marked by dashed oval in FIG. 2A. In FIGS. 2A and 2B each of the transmission lines 116 is flanked by two control lines 126, one on each side, and the three lines are paired in the sense explained above. The transmission lines 116 and control lines 126 are used to control the orientation of the domains under the transmission lines during transmission and reception of a communication signal. This is exemplified by separate and independent lines from the controller 140 to each of the transmission lines 116 and control lines 126.

For example, as illustrated in the dashed-callout, a potential V1 can be applied between each of the control lines 126, flanking each of the transmission lines 116, so as to position the domains in one orientation, indicated by the curved dotted-arrow and domain 112A. Conversely, potential V2 can be applied between the transmission line 116 and the ground plate, thus forcing the domain to assume a position indicated by the straight dashed-arrow and domain 112B. As can be appreciated, orientations 112A and 112B are orthogonal to each other. Thus, by this arrangement there is no need for a "relaxation" time. Rather, the domains are forced by the electrical field to assume each desired orientation, including between the two orientations shown. Consequently, the response time of the domain is highly increased as it no longer depends on the natural relaxation time of the domain. Instead, potential is applied for each desired orientation, i.e., both for a turn on position and for a turn off position.

A similar arrangement can be implemented in the embodiment of FIG. 1A. For example, an optional switch 131 can be connected between the grounded periphery of the common plate 115 and the interior section of the common plate 115 that is situated interior to the RF choke 130. With the switch 131 in the off position, the interior section is floating and a first potential can be applied between the transmission line 116 and control line 126, e.g., control line 126 can be connected to the ground potential and the DC potential applied to the transmission line 116. To gain an orthogonal alignment, the ground potential is removed from the control line 126 and the switch 131 is closed so as to couple the interior section to ground potential, and a second DC potential is applied to the transmission line 116.

FIG. 2B illustrates two features that may be implemented in any embodiment disclosed herein. First, since two control lines 126 are paired with each transmission line 116, each of the control lines is provided with an RF trap 135. Thus, generalizing this feature, regardless of the number of control lines used in the device, the efficiency of transmission in the transmission line is benefited when each control line has at least one RF trap. Moreover, according to a second feature shown in FIG. 2B, each control line can have multiple RF traps 135. In the small section shown in FIG. 2B, each of the control lines 126 includes multiple RF traps 135, except that since the image is only of a section of the device, only two RF traps 135 are visible on each control line.

It goes without saying that the embodiments and features disclosed herein are suitable for any device that uses alignment of molecules to generate material effect. For example, LCD televisions utilize the alignment of the liquid crystal molecules to control the light passing to the screen, thereby generating the desired image. Here again, the on-setting of the molecules is controlled by a potential applied to control lines, but the off-setting of the molecules is done by simply removing the potential and relying on the tendency of the molecules to assume the relaxed state by a chemical process. Thus, the turning off action is slower than the turning on action. However, by utilizing the embodiments and features of the control lines disclosed herein, it is possible to drastically accelerate the turning off time of the molecules, thus enabling faster change of the image, which is beneficial especially for fast changing video, such as for sport events or action scenes.

Additionally, when used in conjunction with RF transmission, such as in FIG. 2A, it was unexpectedly found that having the control lines with the traps on each side of the transmission line enhances the efficiency of the transmission line. It is stipulated that when the transmission line is provided without the flanking control lines, as RF signal flows through the transmission lines, it generates fringes and thus the transmission efficiency is reduced. However, when the transmission line is flanked by the control lines, the fringes are coupled to the control lines, and since the control lines include the RF traps, the energy of the fringes is returned to the transmission line, thus enhancing the transmission efficiency of the transmission line. This is true regardless of the use of a VDC structure.

Thus, in general aspect, a transmission device is provided comprising: a dielectric substrate; a ground plate provided on a first surface of the dielectric substrate; a plurality of RF transmission lines provided on a second surface of the substrate, opposite the first surface; a plurality of coupling lines, each of the coupling lines having at least one RF trap, and wherein each RF transmission line is in close proximity to at least one coupling line. Here, in close proximity means that a coupling line is sufficiently close to an RF transmission line that fringes generated by RF signal transmitted by the RF transmission line are coupled onto the coupling line. Also, in this aspect, the dielectric substrate need not be a variable dielectric constant structure, but rather may be, e.g., a PCB board a Rogers® PCB board, etc.

Figure 3A:
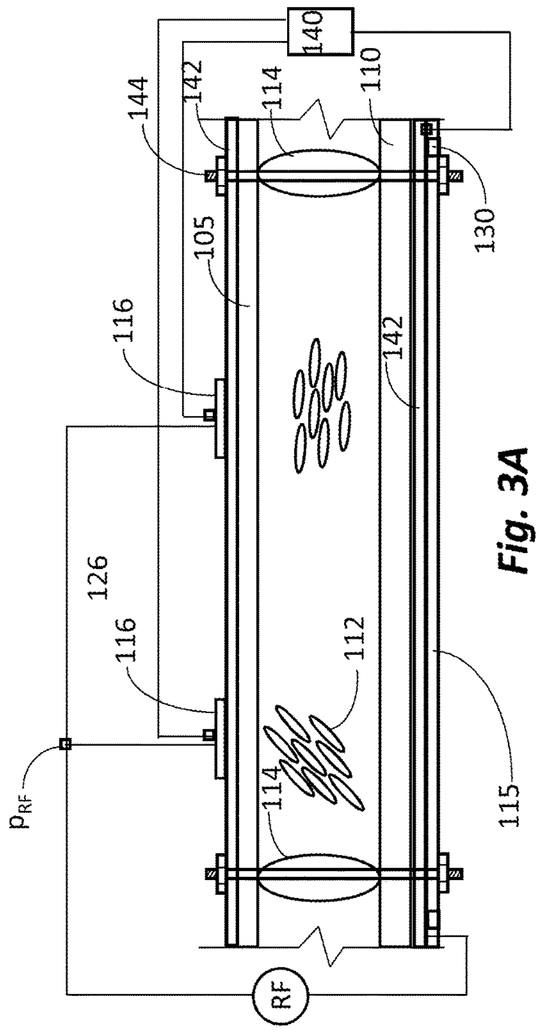

FIG. 3A illustrates an embodiment implemented to enhance response time of the liquid crystal domains, especially the relaxation time. As explained previously, the "turning on" operation is done by applying potential to generate a field aligning the domains. Thus, the response time depends on the domains' reaction time to the applied field. Conversely, the "turning off" operation is generally done by removing the potential, thus relying on the domains natural relaxation time. However, it was discovered by the subject inventors that by applying physical pressure onto the domains, the natural relaxation time is accelerated. Accordingly, in the embodiments shown in FIGS. 3A and 3B the VDC structure is placed under constant pressure.

FIG. 3A illustrates a transmission device having transmission lines 116 provided over the VDC structure. A constant pressure arrangement is incorporated in the VDC structure, wherein in this particular example the constant pressure arrangement is a mechanical structure. Specifically to this example, pressure plates 142 are placed over dielectric plates 105 and 110 and are held together under pressure via clamping devices, such as bolts 144. The pressure plates 142 and the bolts 144 are designed so as to impart a relatively uniform pressure across the entire VDC structure, so as to place the domains under stress. Of course, other arrangements can be implemented to impart constant pressure on the VDC device, but beneficially the pressure should be applied and distributed evenly over the entire VDC structure.

Figure 3B:
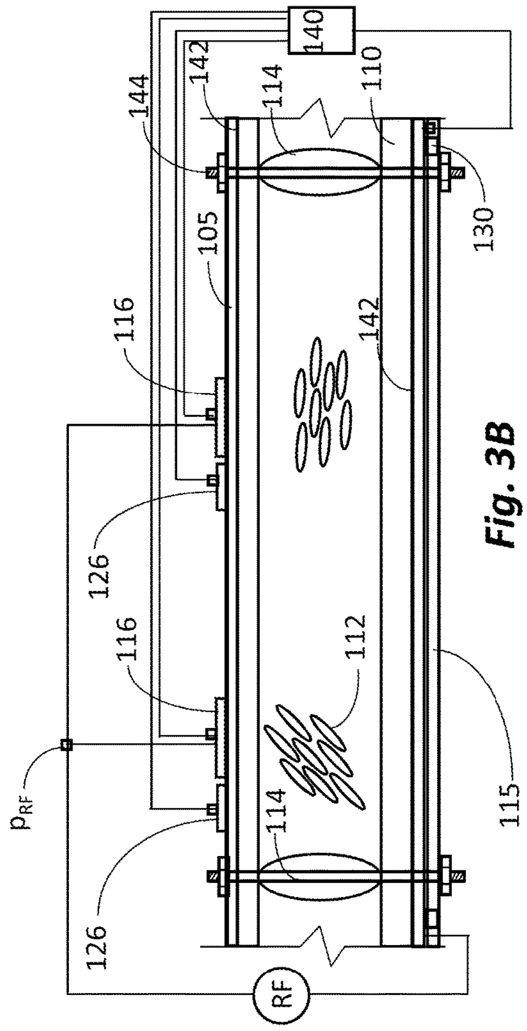
FIG. 3B illustrates the embodiment of FIG. 3A implemented in another device.

FIG. 3B illustrates a similar constant pressure arrangement as shown in FIG. 3A, except that it is applied in the context of the embodiment of FIG. 1A. That is to say that the concept of applying constant pressure onto the VDC structure can be implemented together with any other embodiment or feature disclosed herein. Notably, the embodiment of FIG. 3A does not include separate control lines, as the control signal is applied between the transmission lines 116 and the ground plate 115.

In the embodiments of FIGS. 3A and 3B the relaxation time is accelerated by applying constant pressure to the VDC structure. However, it was also discovered by the subject inventors that a similar result can be achieved by applying transient pressure mechanically or by means of a shock wave. For example, in the embodiment of FIG. 4A, a piezoelectric transducer 155 is used to apply instantaneous pressure to the VDC structure, thereby causing a shock wave that travels throughout the VDC structure. In this example, controller 140 issues an activation signal to the piezoelectric transducer 155 at each time a "turn on" signal is terminated, and the piezoelectric transducer 155 convert that signal into a mechanical movement that applies instantaneous pressure onto the VDC structure (in this example, from the bottom via the ground plate, but can also be from above).

Ultrasonic shock wave transducers have been disclosed in the past, for example for use in medical applications, such as breaking kidney stones. See, e.g., U.S. Pat. No. 5,193,527. In such application the transducer is used to generate a planar shock wave, and then reflectors are used to focus the shock wave energy onto a focal point. However, in the example of FIG. 4A it is preferred that the planar shockwave be applied directly to the VDC structure, without focusing its energy into a focal point. In this manner, the shock wave would travel with a planar front throughout the entire VDC structure.

Figure 4A:
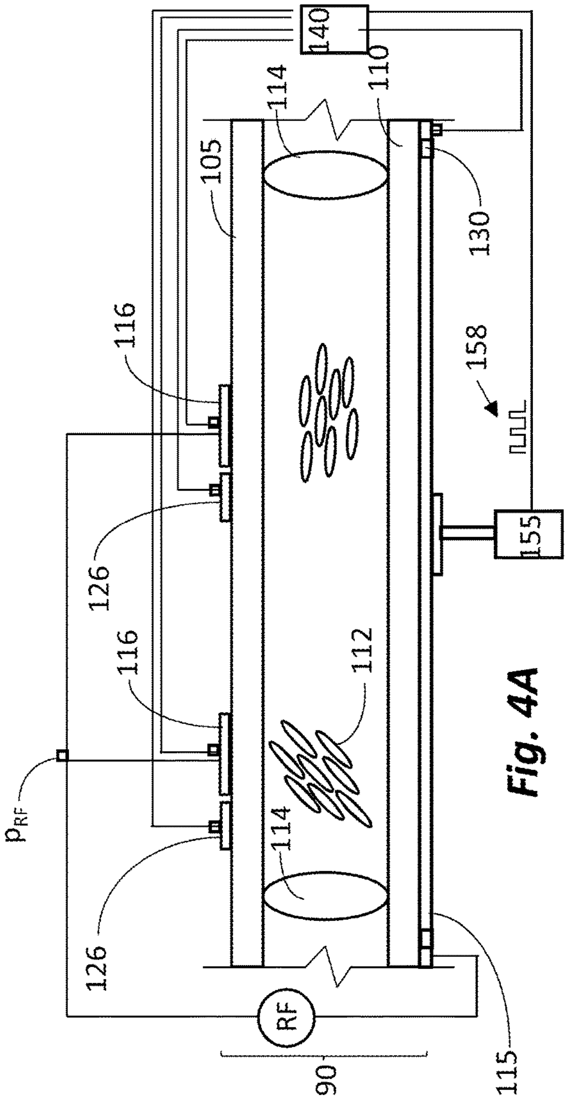

While the application of shockwave in the embodiment of FIG. 4A is done via physical and mechanical contact, this is not a requirement. For example, in the embodiment of FIG. 4B an acoustic transducer 156 produces a sound wave upon receiving the appropriate signal from the controller 140. As before, the controller 140 issues the activation signal at each time a "turn on" signal is terminated, so as to cause the acoustic transducer to generate a sound wave to apply pressure onto the domains, thus accelerating the natural relaxation time.

Figure 4B:
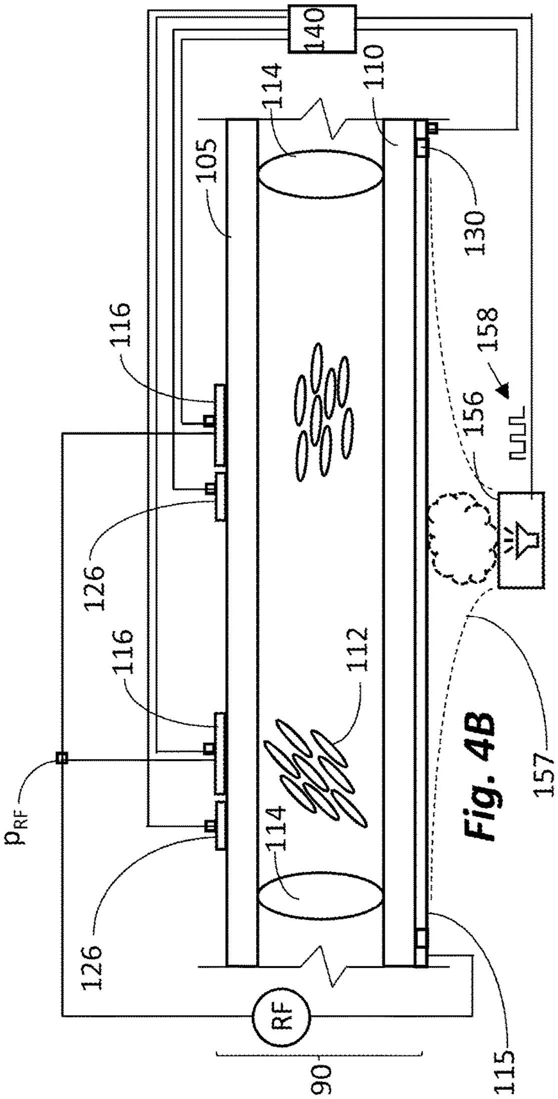
FIG. 4B is a cross-section of a part of an electronic device showing domain control with sonic pressure according to an embodiment.

Incidentally, the dotted "cloud" in FIG. 4B schematically represents the medium between the acoustic transducer 156 and the VDC structure, which may be air, liquid (such as oil) or solid (such as a dielectric material). The medium can be used to enhance the coupling of the acoustic wave to the VDC structure, and may also used to shape and direct the wave, as illustrated by the dashed funnel 157. For example, a funnel shaped dielectric plate may be placed between the acoustic transducer and the common potential plate.

According to another embodiment, the signal from controller 140 is in the form of continuous square wave 158 at a desired frequency. The chosen frequency may be fast enough to statistically always have a high during a relaxation period, thus accelerating the relaxation time of the domains. Alternatively, if for a particular application the frequency of the relaxation period is known beforehand, then the frequency of the square wave can be set accordingly.

Figure 5:
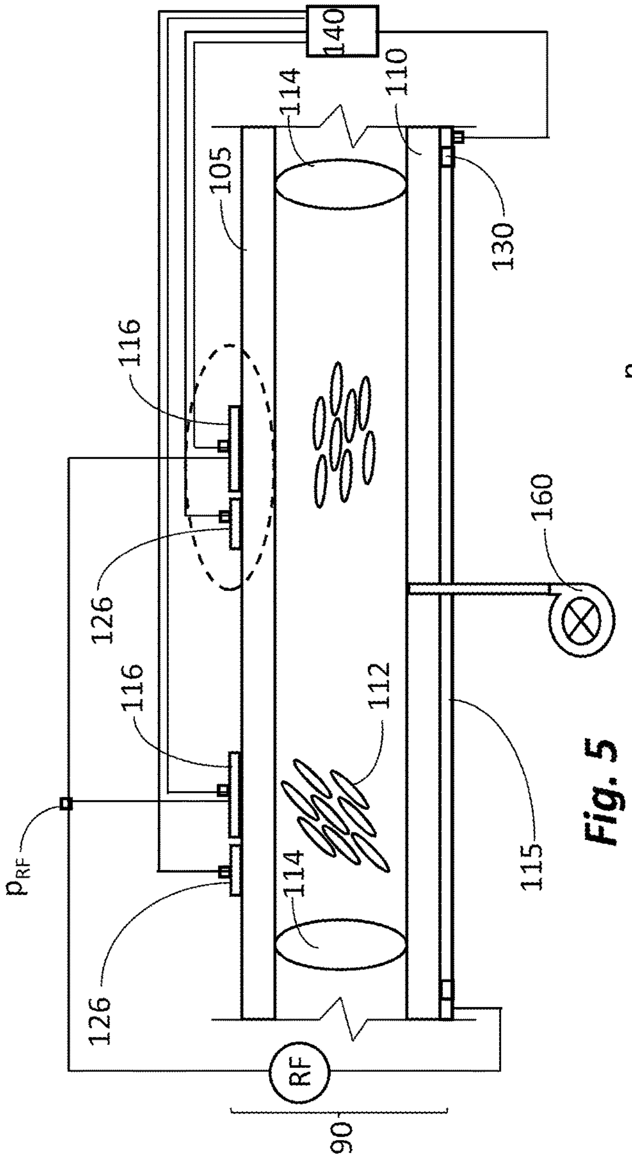
FIG. 5 is a cross-section of a part of an electronic device showing domain control with hydraulic pressure according to an embodiment.

According to yet another embodiment, illustrated in FIG. 5, the pressure is generated during the fabrication of the VDC structure. That is, normally the VDC structure is generated by pumping vacuum between the dielectrics 105 and 110, and then filling up the void with liquid nematic material. However, as shown in FIG. 5, according to this embodiment, after pumping the vacuum, the liquid nematic material is injected by pump 160 under pressure, so as to generate hydraulic pressure inside the VDC structure. This hydraulic pressure remains within the VDC structure after sealing the liquid injection port and removing the injection apparatus and pump 160. Thus, the nematic domains remain constantly under hydraulic pressure.

Figure 6:
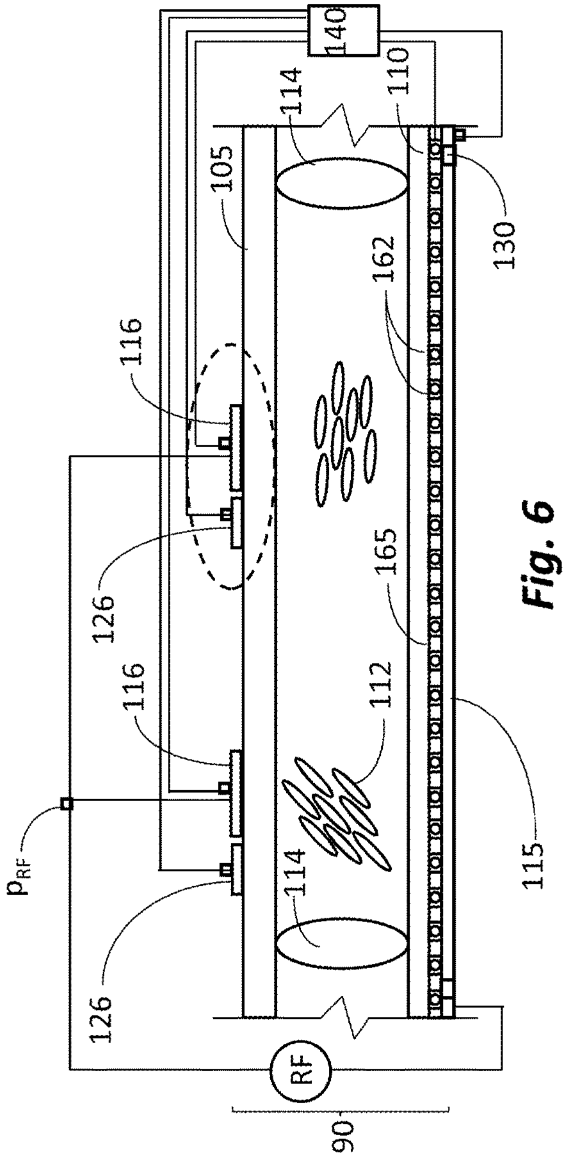
FIG. 6 is a cross-section of a part of an electronic device showing domain control with magnetic pressure according to an embodiment.

According to further embodiments, the relaxation time is accelerated by application of magnetic field on the domains. In FIG. 6 a magnet plate 165 is included in the VDC structure. The magnet plate 165 may incorporate a plurality of permanent magnets, but more beneficially includes a plurality of electromagnetic coils 162. The electromagnetic coils are energized by controller 140, nominally only during relaxation periods.

Thus, according to disclosed embodiments, a method for operating a transmission device having conductors provided over a variable dielectric constant plate, comprising: applying signals to at least a first subset of the conductors to cause transmission of the signals; applying control signal to at least a second subset of the conductors to cause domains within the variable dielectric constant plate to align according to field generated by the control signal; stopping application of the control signal to thereby cause the domain to relax to natural orientation; and applying pressure onto the domains to thereby accelerate time required for the domain to relax to natural orientation. The step of applying pressure may be selected from: applying mechanical pressure onto the variable dielectric constant plate, applying sonic pressure onto the variable dielectric constant plate; applying hydraulic pressure inside the variable dielectric constant plate; and applying magnetic field onto the variable dielectric constant plate. Conductors within the second subset may be same conductors that are in the first subset.

Figure 7:
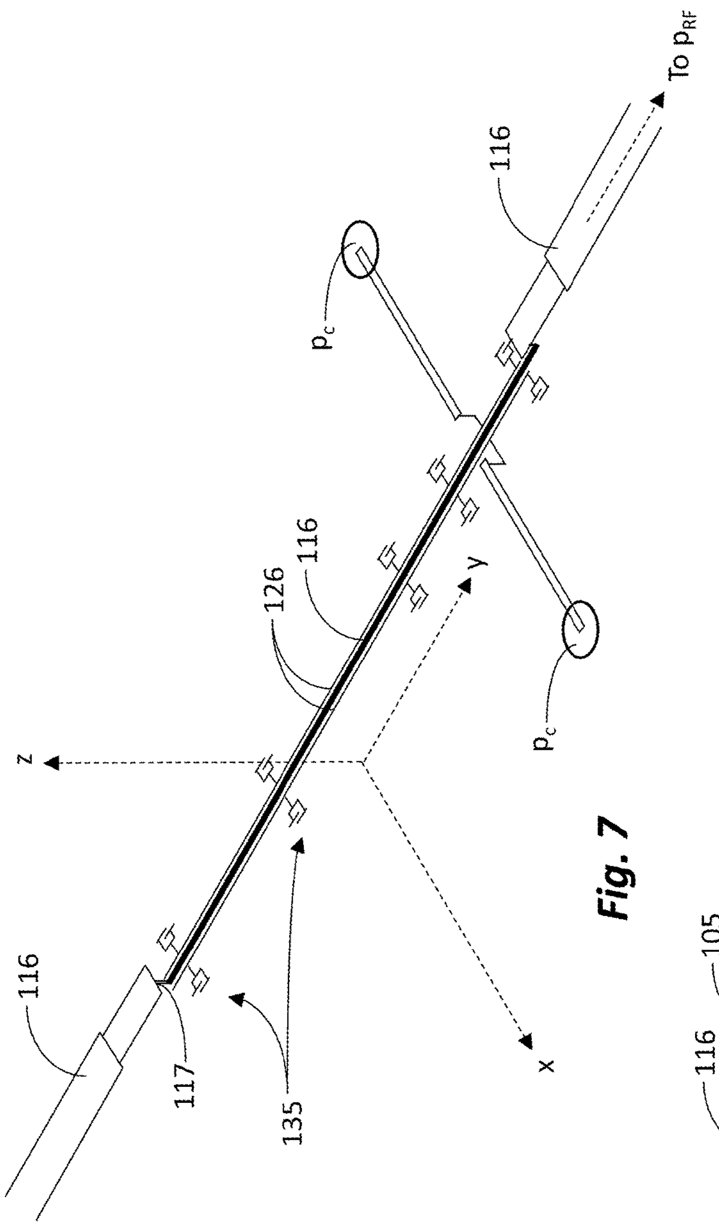
FIG. 7 is an isometric view of a phase shifter according to an embodiment.

FIG. 7 is an isometric view of a phase shifter according to an embodiment. The illustration in FIG. 7 only depicts the relevant conductors of a phase shifter on a single transmission line, without showing any of the insulating substrates. Also, in the illustration of FIG. 7 the main transmission line 116 is shown at a different elevation than the phase shifter, which includes a sectional transmission line 116. The embodiment of FIG. 7 includes two control lines 126 flanking the sectional transmission line 116. Each control line includes a plurality of RF traps 135 distributed along its length. Each control line 126 is connected to a separate electrode that functions as a control port $P_c$. Notably, the phase shifters have no ohmic contact to the corresponding transmission line.

Thus a phase shifter for RF transmission line is provided, comprising: a sectional transmission line; a first control line positioned on a first side of the sectional transmission line; a first terminal connected to the first control line; a second control line positioned on a second side of the sectional transmission line opposite the first side; a second terminal connected to the second control line; a plurality of first RF traps, each connected to the first control line; and a plurality of second RF traps, each connected to the second control line.

Figure 8:
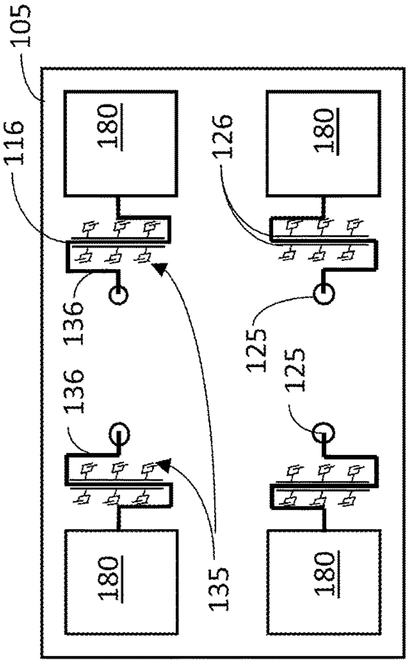
FIG. 8 is a top view of a 2×2 antenna array according to an embodiment.

FIG. 8 is a top view of a 2×2 antenna array according to an embodiment. The array includes four radiation patches 180, arranged in a two-dimensional array. Each patch 180 is coupled to a transmission line 116. In order to control the directionality of the beam generated by the array, the transmission in each line 116 is controlled by a phase shifter positioned along a segment of one of the transmission lines, such as the phase shifter illustrated in FIG. 7. Each delay line is coupled to a connector 125 that leads to a common port, $P_{RF}$, optionally utilizing a corporate feed, which is not visible in this view as it is situated below the structure shown. As in FIG. 7, each phase shifter includes one or two control lines 126, each having multiple RF traps 135. Note that although the transmission in each transmission line is controlled by a phase shifter, the phase shifter has no ohmic contact to the corresponding transmission line.

Thus, an antenna is provided, comprising: a plurality of radiating patches arranged in an array; a plurality of transmission lines, each connected to one of the radiating patches, each transmission lines coupled to an RF port; a plurality of phase shifters, each positioned along a segment of one of the transmission lines, each of the plurality of phase shifters having no ohmic contact to the corresponding transmission line, and each phase shifter comprising at least one control line flanking the segment of the corresponding transmission line, and a plurality of RF traps positioned along the length of the control line.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. An electronic transmission device transmitting electrical signals, comprising:
- a variable dielectric constant (VDC) structure having variable VDC material sandwiched between a bottom dielectric plate and a top dielectric plate, the VDC material having plurality of orientable domains;
- a common potential plate positioned below the bottom dielectric plate;
- a plurality of transmission lines positioned above the top dielectric plate, each transmission line transmitting the electrical signals;
- a plurality of control lines, wherein each one of the transmission lines is paired with at least one of the control lines, such that the sphere of influence of paired control line and transmission line overlaps; and
- a plurality of ports connecting control potentials among the common potential plate, the plurality of transmission lines and the plurality of control lines to thereby control spatial orientation of the domains.

2. The device of claim 1, wherein the common potential plate comprises a peripheral area at grounded potential, interior area at floating potential, and an RF choke positioned between the peripheral area and the interior area.

3. The device of claim 1, wherein each transmission line is paired with two control lines.

4. The device of claim 1, wherein the plurality of transmission lines are coupled to a common RF port.

5. The device of claim 4, wherein each one of the plurality of ports is connected to only one of the transmission lines or control lines.

6. The device of claim 1, wherein each of the control lines comprises at least one RF trap.

7. The device of claim 6, wherein each RF trap comprises: a common stem connected to the control line; a splitter connected to the common stem; and
- a plurality of frequency matching branches, each connected to the splitter and each having an overlap section spatially parallel to an overlap section of another frequency matching branch.

8. The device of claim 7, wherein each branch of the frequency matching branches has a different length than other branches of the same frequency matching branches.

9. The device of claim 1, further comprising a pressure applicator applying to the VDC structure one of: mechanical pressure, magnetic pressure, sonic pressure, and hydraulic pressure.

10. An antenna, comprising:
- a variable dielectric constant plate having a top dielectric plate, a bottom dielectric plate, and a variable dielectric material between the top and bottom dielectric plates;
- a common potential plate provided below the bottom dielectric plate;
- a plurality of radiators;
- a plurality of control lines provided over the top dielectric plate;
- a plurality of transmission lines provided above the top dielectric plate, each of the transmission lines coupled to one of the radiators and to an RF port, and each one of the transmission lines is paired with at least one of the control lines, such that the sphere of influence of paired control line and transmission line overlaps; and
- a plurality of control ports connecting control potentials among the common potential plate, the plurality of transmission lines and the plurality of control lines to thereby control spatial orientation of domains within the variable dielectric constant material.

11. The antenna of claim 10, wherein the radiators are arranged as an array having a radiation beam steerable according to control potential applied to the plurality of control ports.

12. The antenna of claim 11, wherein the common potential plate comprises a peripheral area at grounded potential, interior area at floating potential, and an RF choke positioned between the peripheral area and the interior area.

13. The antenna of claim 12, wherein each of the control lines comprises at least one RF trap.

14. The antenna of claim 13, wherein each transmission line is paired with two control lines.

15. An electronic transmission device transmitting electrical signals, comprising:
- a variable dielectric constant (VDC) structure having variable VDC material sandwiched between a bottom dielectric plate and a top dielectric plate, the VDC material having plurality of orientable domains;
- a common potential plate positioned below the bottom dielectric plate;
- a plurality of transmission lines positioned above the top dielectric plate, each transmission line transmitting the electrical signals; and
- a pressure applicator applying to the VDC structure one of: mechanical pressure, magnetic pressure, sonic pressure, and hydraulic pressure.

16. The device of claim 15, wherein the pressure applicator comprises a pressure plate and clamps exerting static mechanical pressure onto the VDC structure.

17. The device of claim 15, wherein the pressure applicator comprises a transducer applying instantaneous pressure to the VDC structure, thereby causing a shock wave that travels throughout the VDC structure.

18. The device of claim 15, wherein the pressure applicator comprises an acoustic transducer.

19. The device of claim 15, wherein the pressure applicator comprises a magnetic plate.

* * * * *